United States Patent
Hu et al.

(10) Patent No.: US 11,764,621 B1
(45) Date of Patent: Sep. 19, 2023

(54) WIRELESS POWER TRANSFER WITH INTEGRATED COMMUNICATIONS

(71) Applicant: Apple Inc., Cupertino, CA (US)

(72) Inventors: Yongxuan Hu, San Jose, CA (US); Nileshbhai J. Shah, Irvine, CA (US); José V. Santos Martinez, San Jose, CA (US); Stephen C. Terry, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/457,374

(22) Filed: Dec. 2, 2021

Related U.S. Application Data (60) Provisional application No. 63/261,077, filed on Sep. 10, 2021.

(51) Int. Cl.
*H02J 50/80* (2016.01)
*H02J 50/60* (2016.01)
*H02J 50/12* (2016.01)

(52) U.S. Cl.
CPC ............. *H02J 50/80* (2016.02); *H02J 50/12* (2016.02); *H02J 50/60* (2016.02)

(58) Field of Classification Search
CPC ............. H02J 50/80; H02J 50/12; H02J 50/60
See application file for complete search history.

(56) References Cited

U.S. PATENT DOCUMENTS

| | | | | |
|---|---|---|---|---|
| 2009/0296535 A1* | 12/2009 | Jones | ...................... | H04N 5/765 369/1 |
| 2012/0104867 A1* | 5/2012 | Mudrick | .................. | H02J 50/80 307/104 |
| 2014/0091634 A1* | 4/2014 | Mayo | ...................... | H02J 50/40 307/104 |
| 2016/0181818 A1* | 6/2016 | Joye | ...................... | H04B 5/0037 307/104 |
| 2016/0344236 A1* | 11/2016 | Misawa | .................. | H02M 1/36 |
| 2017/0018977 A1* | 1/2017 | Van Wageningen | .... | H02J 50/60 |
| 2017/0033591 A1* | 2/2017 | Govindaraj | ............. | H02J 50/10 |
| 2018/0097406 A1* | 4/2018 | Chen | ...................... | H02J 50/12 |

(Continued)

FOREIGN PATENT DOCUMENTS

CN 108023411 A * 5/2018 ............... H02J 50/10

OTHER PUBLICATIONS

Electronics—tutorial, "Reactive power," pp. 1-10 (Year: 2017).*

*Primary Examiner* — Daniel Cavallari
(74) *Attorney, Agent, or Firm* — FLETCHER YODER PC (57) ABSTRACT

A wireless power transmitter can include an inverter that receives a DC input and generates an AC output to drive a wireless power transmit coil coupled to an output of the inverter as well as voltage and current sensors that measure the DC input. The wireless power transmitter can further include a power management accumulator including hardware that receives voltage and current samples from the voltage and current sensors and multiplies corresponding voltage and current samples to produce power samples and memory locations that store corresponding voltage, current, and power samples. The wireless power transmitter can still further include a programmable controller that controls switching devices of the inverter responsive at least in part to the voltage, current and power samples stored in the memory locations of the power management accumulator.

24 Claims, 3 Drawing Sheets

(56) References Cited

U.S. PATENT DOCUMENTS

| | | | |
|---|---|---|---|
| 2019/0157907 A1* | 5/2019 | Sugiyama | H02J 50/80 |
| 2019/0173316 A1* | 6/2019 | Shin | H02M 3/33573 |
| 2019/0229561 A1* | 7/2019 | Vocke | H02J 50/60 |
| 2019/0386523 A1* | 12/2019 | Jung | H02J 50/80 |
| 2020/0083746 A1* | 3/2020 | Lisi | H01F 38/14 |
| 2020/0365316 A1* | 11/2020 | Tikka | H01F 38/14 |
| 2021/0050746 A1* | 2/2021 | Malan | H02J 50/60 |
| 2021/0328443 A1* | 10/2021 | Wolgemuth | H02J 7/00309 |
| 2021/0367453 A1* | 11/2021 | Galigekere | H02M 3/01 |

\* cited by examiner

WIRELESS POWER TRANSFER WITH INTEGRATED COMMUNICATIONS

CROSS-REFERENCE TO RELATED APPLICATIONS

This application claims priority to U.S. Provisional Application No. 63/261,077, filed Sep. 10, 2021, entitled "Wireless Power Transfer With Integrated Communications," the disclosure of which is incorporated by reference in its entirety for all purposes.

BACKGROUND

Wireless power transfer, in which power is delivered via inductive coupling between a wireless power transmitter (PTx) and a wireless power receiver (PRx), is useful in a variety of applications, including powering and/or recharging battery powered personal electronic devices. In many applications, various power accounting techniques may be used for a variety of purposes. As one example, a PTx can receive from a PRx an indication of how much power the PRx is receiving and/or how much energy the PRx received over a given time period. The PTx can compare this information to the power/energy it delivered over the same time period to determine whether there is a "foreign" object other than the PRx that is also receiving a portion amount of the transmitted power/energy.

SUMMARY

Heretofore, power accounting techniques such as those described above have been implemented in software running on microcontrollers or microprocessors. However, this can significantly increase cost and complexity of wireless power transfer solutions. Thus, it may be desirable to provide hardware-based implementations that can perform the power measurements without requiring significant software development and microprocessor/microcontroller power.

A wireless power transmitter can include an inverter that receives a DC input and generates an AC output to drive a wireless power transmit coil coupled to an output of the inverter as well as voltage and current sensors that measure the DC input. The wireless power transmitter can further include a power management accumulator including hardware that receives voltage and current samples from the voltage and current sensors and multiplies corresponding voltage and current samples to produce power samples and memory locations that store corresponding voltage, current, and power samples. The wireless power transmitter can still further include a programmable controller that controls switching devices of the inverter responsive at least in part to the voltage, current and power samples stored in the memory locations of the power management accumulator. The memory locations can form a circular buffer.

The programmable controller can receive information from a wireless power receiver indicating power received by the wireless power receiver over a time interval. The programmable controller can compare power received by the wireless power receiver over a time interval to power samples stored in the memory locations of the power management accumulator for the time interval to detect a foreign object. The programmable controller can reduce or stop wireless power transfer responsive to detecting a foreign object. Any two or more of the inverter, power management accumulator, and programmable controller can be combined into a single integrated circuit.

The wireless power transmitter can still further include a hardware mean squared current calculator that computes values corresponding to an RMS current delivered to the wireless power transmit coil. The values corresponding to the RMS current delivered to the wireless power transmit coil can be stored in the memory locations of the power management accumulator. The hardware mean squared current calculator can include dedicated hardware blocks that receive capacitor voltage samples of a voltage appearing across a capacitor in series with the wireless power transmit coil, determine a current through the capacitor from the capacitor voltage samples, and calculate values corresponding to the RMS current delivered to the wireless power transmit coil from the determined current. Any three or more of the inverter, power management accumulator, mean squared current calculator, and programmable controller can be combined into a single integrated circuit.

An integrated circuit for use in a wireless power transfer system can include a plurality of switching devices couplable to a wireless power transfer coil selectively operable as an inverter of a wireless power transmitter or as a rectifier of a wireless power receiver and voltage and current sensors coupled to the plurality of switching devices that measure a DC input into the switching devices when operated as an inverter or a DC output from the switching devices when operated as a rectifier. The integrated circuit can further include a power management accumulator having hardware that receives voltage and current samples from the voltage and current sensors and multiplies corresponding voltage and current samples to produce power samples and memory locations that store corresponding voltage, current, and power samples. The integrated circuit can still further include a programmable controller that controls the plurality of switching devices responsive at least in part to the voltage, current or power samples stored in the memory locations of the power management accumulator. The memory locations can form a circular buffer.

The programmable controller can operate the plurality of switching devices as an inverter of a wireless power transmitter and receives information from a wireless power receiver indicating power received by the wireless power receiver over a time interval. The programmable controller can compare power received by the wireless power receiver over a time interval to power samples stored in the memory locations of the power management accumulator for the time interval to detect a foreign object. The programmable controller can reduce or stop wireless power transfer responsive to detecting a foreign object. The programmable controller can alternatively operate the plurality of switching devices as a rectifier of a wireless power receiver and transmits information to a wireless power transmitter indicating power received by the wireless power receiver over a time interval.

The integrated circuit can further include a hardware mean squared current calculator that computes values corresponding to an RMS current through a wireless power transfer coil, the wireless power transfer coil being either a wireless power transmit coil driven by the plurality of switching devices operating as an inverter or a wireless power receive coil that drives the plurality of switching devices operating as a rectifier. The values corresponding to the RMS current through the wireless power transfer coil can be stored in the memory locations of the power management accumulator. The hardware mean squared current calculator can include dedicated hardware blocks that receive capacitor voltage samples of a voltage appearing across a capacitor in series with the wireless power transfer coil, determine a current through the capacitor from the capacitor voltage samples, and calculate values corresponding to the RMS current through the wireless power transfer coil from the determined current A hardware mean squared current calculator that computes values corresponding to an RMS current through a wireless power transfer coil can include dedicated hardware blocks that (a) receive capacitor voltage samples of a voltage appearing across a capacitor in series with the wireless power transfer coil and (b) determine a current through the capacitor from the capacitor voltage samples; and calculate values corresponding to the RMS current through the wireless power transfer coil from the determined current. The hardware mean squared current calculator can be configured to store the calculated values corresponding to the RMS current in a buffer of a power management accumulator. The hardware mean squared current calculator and the power management accumulator can be part of the same integrated circuit.

DETAILED DESCRIPTION

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

Figure 1:
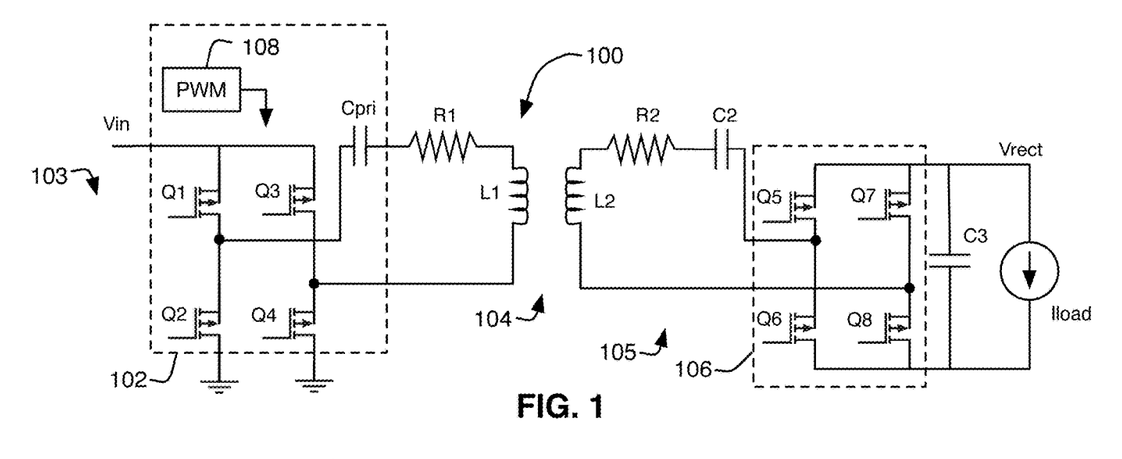
FIG. 1 illustrates a high level schematic of a wireless power transfer system.

FIG. 1 illustrates a high level schematic of a wireless power transfer system 100. The left side of the figure illustrates a power transmitter (PTx) 103, which receives an input voltage Vin and transmits energy to a receiver via magnetic induction 104, i.e., by coupling between transmit and receive coils represented by inductors L1 and L2, respectively. (Each coil/inductor also has a corresponding intrinsic/parasitic resistance: R1/R2. These are illustrated in the schematic of FIG. 1 but are not separate physical components.) The right side of the figure depicts a power receiver (PRx) 105 that receives power via the aforementioned magnetic coupling and delivers power to a load depicted by current source Iload. An input voltage Vin is supplied to inverter 102. Inverter 102 generates an AC output having a predetermined frequency and a magnitude that is determined by input voltage Vin, which may be regulated by a separate regulator (not shown). This AC output voltage of inverter 102 is provided the transmit coil, represented by inductor L1, which is magnetically coupled a corresponding receive coil, represented by inductor L2. This results in energy transfer to the PRx 105. PRx 105 includes a receive coil, represented by inductor L2, which has a voltage induced therein by magnetic induction via transmit coil L1. This AC voltage may be provided to a rectifier 106, discussed in greater detail below, that converts the received AC voltage to an output DC voltage (Vrect) that may be supplied to a load. The wireless power transfer system 100 may include additional components, such as transmitter tuning capacitor Cpri and receiver tuning capacitor C2 that may be used to tune the resonant frequency of the transmit and receive circuits to improve operating efficiency of the system.

In the illustrated embodiment, inverter 102 is a full bridge inverter made up of four switching devices Q1-Q4, although other inverter topologies could be used as appropriate for a given application. Also depicted at a high level is PWM controller 108, which provides pulse width modulation signals to the switching devices Q1-Q4 to generate a desired output voltage and/or current. These switching devices are illustrated as MOSFETs (metal-oxide-semiconductor field effect transistors), though other types switching devices (including, for example, IGBTs (insulated gate bipolar transistors), junction field effect transistors (JFETs), etc. could be used as appropriate for a given embodiment. Likewise, any suitable semiconductor technology, such as silicon, silicon carbide (SiC), gallium nitride (GaN), could be used depending on the specific application. The same applies to all other switching devices (including diodes) discussed in the present application. Switching devices Q1-Q4 may be alternately switched to connect an input DC voltage (e.g., from boost regulator (not shown)) to the transmit winding L1, producing an AC voltage that may be coupled to the PRx as described above.

Operation of inverter 102 will induce an AC voltage in magnetically coupled PRx receiver coil L2. This AC voltage may be coupled to a rectifier 106. In the illustrated embodiment, rectifier 106 is a full bridge active rectifier made up of four switches Q5-Q7. Although illustrated as MOSFET switches, other rectifier types, constructed using any suitable semiconductor technology, could also be used. These alternative configurations can provide for increased operating efficiency in some applications.

Figure 2:
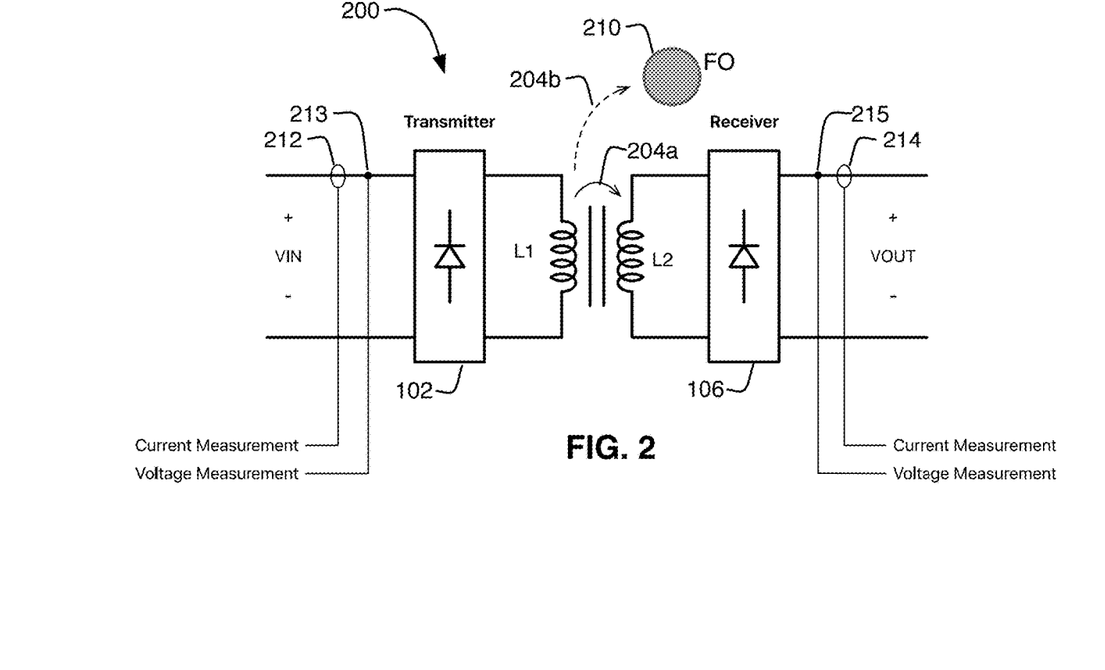
FIG. 2 illustrates a wireless power transfer system employing power accounting for foreign object detection.

FIG. 2 illustrates a wireless power transfer system 200 employing power accounting for foreign object detection. More specifically, an input voltage Vin is supplied to an input of inverter/transmitter 102. Inverter/transmitter 102 generates an AC voltage that is applied to power transmit winding L1. This voltage is inductively coupled 204a to power receive winding L22, which is coupled to the input of rectifier/receiver 106. Receiver rectifier 106 generates therefrom an output voltage Vout that can be delivered to a load. In addition to this intended wireless power transfer, energy may be inductively coupled (204b) from transmit winding L1 into a foreign object 210. Exemplary foreign objects may include metallic objects such as coins, keys, paperclips, and the like that may be inadvertently left near transmitter 102 and or receiver 106. Depending on the physical configuration, power may be wirelessly delivered to foreign object 210 instead of being delivered to receiver 106. Some techniques for detecting and mitigating this undesirable power transfer to foreign objects have been proposed and implemented, including various techniques based on power accounting, i.e., keeping track of the amount of power transmitted by transmitter 102 and/or received by receiver 106.

As one simplified example, by measuring the inverter/transmitter's DC input current 212 and voltage 213, the input power can be determined. Similarly, by measuring the rectifier/receiver's DC output voltage 215 and current 214, the output power can be determined. The difference between the input power and output power is then the amount of power that is being delivered to foreign object 210. The above technique can be modified to account for losses associated with operation of inverter/transmitter 102, rectifier/receiver 106, coils L1, L2, and other system components. Because the electrical characteristics of the respective transmitter and receiver devices are known to the designers and constructors of such devices, it is possible for them to characterize the losses experienced by such devices as a function of loading. Thus, the power accounting model may be tailored to achieve a level of accuracy and precision depending on the requirements of a particular application.

Figure 3:
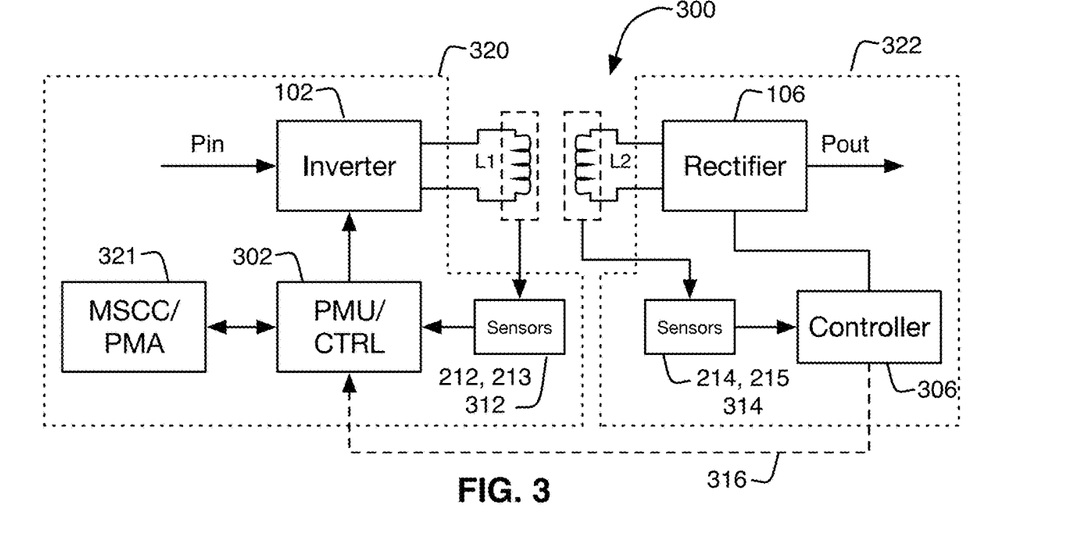
FIG. 3 illustrates a simplified block diagram of a wireless power transfer system with hardware-based power accounting.

Additionally or alternatively, AC losses associated with the transmit and receive coils L1 and L2 may be estimated using the RMS coil current and the known impedance of the coil. These $I^2R$ losses may be estimated if the RMS coil current is known, which may be achieved through the use of further AC side sensors 312, 314, not shown in FIG. 2, but depicted in block diagram form in FIG. 3. FIG. 3 illustrates a simplified block diagram of a wireless power transfer system with hardware-based power accounting. As described above, an inverter/transmitter 102 receives DC input power and generates an AC output that drives a transmit coil L1. Transmit coil L1 may be inductively coupled to receive coil L2, which is, in turn, coupled to rectifier/receiver 106. Rectifier/receiver 106 can convert the induced AC voltage from receive coil L2 and converts it to DC output power Pout, that may be used to drive a load, such as a battery charger or personal electronic device/accessory.

On the transmitter side, sensors 212, 213, 312 may include the input current and voltage sensors 212, 213 discussed above as well as an additional current sensor 312 monitoring the AC current through transmit coil L1. (As depicted in FIG. 3, the sensors are shown coupled to the AC side of the inverter, but this is merely for drawing conciseness, and it should be understood that the DC side signals may be coupled to the input of inverter/transmitter 102 as depicted in FIG. 2.) These sensor readings may be provided to a power management unit (PMU)/controller 302 that provides overall control for the wireless power transmitter. PMU/controller 302 may be based on any suitable circuitry, such as a programmable/programmed microprocessor or microcontroller. However, PMU/controller 302 could also be constructed using discrete digital logic, hybrid digital/analog control circuitry, field programmable gate arrays (FPGAs), or the like. PMU/controller 302 can use the received sensor information to provide suitable drive signals to the switching devices of inverter/transmitter 102. These suitable drive signals may be determined based on the readings from sensors 212, 213, and/or 312 and a suitable control algorithm implemented by PMU/controller 302. Alternatively, the control algorithm implemented by PMU controller 302 may also take into account feedback 316 received from receiver side controller 306 in producing the drive signals for inverter/transmitter 102. The transmit side control circuitry can also include mean square current calculator (MSCC) and power management accumulator (PMA) blocks 321, which are described in greater detail below.

In some applications, various transmitter side components described above may be integrated into a single application specific integrated circuit (ASIC). For example, the inverter power switches, 102, sensors 212, 213, and 312, PMU/controller 302, and mean squared current calculator and power management accumulator 321 may all be constructed as a single wireless power transmitter integrated circuit 320. In other applications, one or more components may be external to such an ASIC. For example, power switches of inverter 102 may be separate components that attach to the integrated circuit, which can allow for varying power levels to be supplied using a single sensor and control module. In other embodiments, sensors 212, 213, and 312 may be separate components that interface with integrated circuit 320. Additionally, integrated circuit 320 may include additional circuitry not expressly illustrated but that would nonetheless be used in the above-described application, including, without limitation, analog to digital converters for digitizing the sensor outputs, communications circuitry for interfacing with the receiver side circuitry, additional I/O circuitry, clock circuitry, voltage and/or current regulation circuitry, additional sensor circuitry, and the like.

On the receiver side, sensors 214, 215, 314 may include the output current and voltage sensors 214, 215 discussed above as well as an additional current sensor 314 monitoring the AC current through receive coil L2. (As depicted in FIG. 3, the sensors are shown coupled to the AC side of the rectifier, but this is merely for drawing conciseness, and it should be understood that the DC side signals may be coupled to the output of rectifier/receiver 106 as depicted in FIG. 2.) These sensor readings may be provided to a controller 306 that provides overall control for the wireless power transmitter. PMU/controller 306 may be based on any suitable circuitry, such as a programmable/programmed microprocessor or microcontroller. However, PMU/controller 306 could also be constructed using discrete digital logic, hybrid digital/analog control circuitry, field programmable gate arrays (FPGAs), or the like. PMU/controller 306 can use the received sensor information to provide suitable drive signals to the switching devices of rectifier/receiver 106. These suitable drive signals may be determined based on the readings from sensors 212, 213, and/or 312 and a suitable control algorithm implemented by PMU/controller 306.

In some applications, various receiver side components described above may be integrated into a single application specific integrated circuit (ASIC). For example, the rectifier power switches 106, sensors 214, 215, and 314, and PMU/controller 306 may all be constructed as a single wireless power receiver integrated circuit 322. In other applications, one or more components may be external to such an ASIC. For example, power switches of rectifier 106 may be separate components that attach to the integrated circuit, which can allow for varying power levels to be supplied using a single sensor and control module. In other embodiments, sensors 214, 215, and 314 may be separate components that interface with integrated circuit 322. Additionally, integrated circuit 322 may include additional circuitry not expressly illustrated but that would nonetheless be used in the above-described application, including, without limitation, analog to digital converters for digitizing the sensor outputs, communications circuitry for interfacing with the receiver side circuitry, additional I/O circuitry, clock circuitry, voltage and/or current regulation circuitry, additional sensor circuitry, and the like. Additionally, integrated circuit 322 could be the structurally the same as integrated circuit 320, with a variable configuration or programming allowing it to function as either wireless power transmit circuitry, wireless power receive circuitry, or bidirectional wireless power transfer circuitry, as appropriate for a given application.

As described above, wireless power transmitter circuitry 320 can include dedicated hardware for power accounting measurements, including power management accumulator and mean squared current calculator 321. Although depicted as a single module in FIG. 3, these may be implemented as separate hardware modules. Operation of the power management accumulator is described below primarily with respect to FIGS. 4 and 5. Operation of the mean squared current calculator is described below primarily with reference to FIG. 6.

Figure 4:
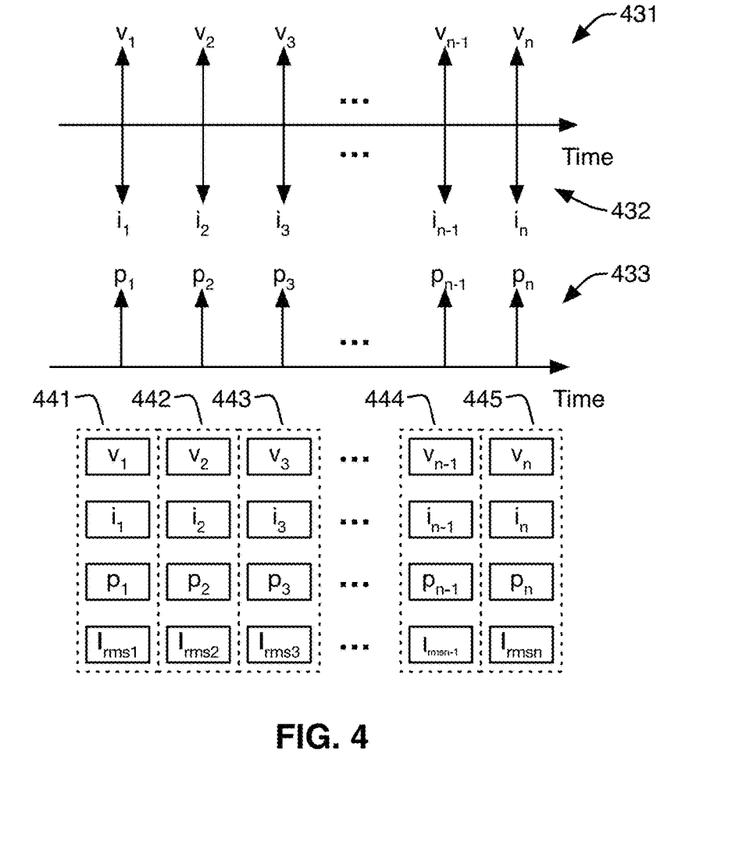
FIG. 4 illustrates a wireless power transmitter voltage and current sampling arrangement and corresponding storage registers/buffers.

FIG. 4 depicts a sampling and storage arrangement for various current, voltage, and power parameters of the wireless power transmitter. Sensors 212 and 213 may be configured to provide a temporal series of voltage samples 431 (v1, v2, v3, etc.) and a series of current samples 432 (i1, i2, i3, etc.) to power management unit/controller 302. These voltage samples 431 and current samples 432 can correspond to instantaneous DC voltage and current at the input of inverter/transmitter 102. The respective samples may be filtered, calibrated, or otherwise conditioned by circuitry (not shown) disposed between the sensor and PMU/controller 302. Providing hardware-based filtering, calibration, and conditioning of the sample values can reduce the computational burden on PMU/controller 302. In some cases, the sensor values may pass directly to mean squared current calculator and power management accumulator 321, bypassing PMU/controller 302. Additionally, the sensor signals may be converted to digital values by analog to digital converters (ADCs) disposed between the sensors and PMU/controller 302, built into PMU/controller 302, or provided between the sensors and mean squared current calculator/power management accumulator 321 (for applications in which the samples are passed directly to module 321 initially).

Corresponding voltage and current samples may be multiplied together to produce instantaneous power samples 433, i.e., v1×i1=p1; v2×i2=p2; etc. This multiplication may be performed by dedicated hardware of power management accumulator 321, thus reducing the computational burden of controller 302. The voltage, current, and power samples may be stored in corresponding registers or memory positions 441-445 as shown in FIG. 4. These registers or memory positions may be used to form a circular buffer for use by power management accumulator 321 and PMU/controller 302 as further described below. The registers/memory positions 441-445 may also include other parameters, such as RMS (root-mean-squared) current samples determined as described in greater detail below.

Figure 5:
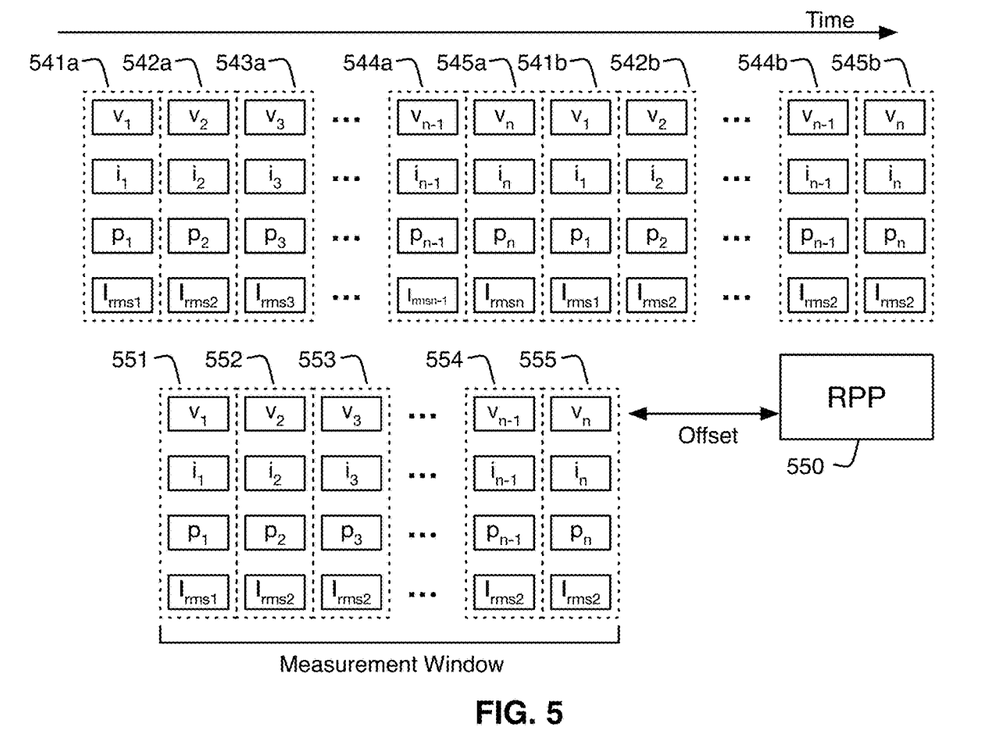
FIG. 5 illustrates a wireless power accounting framework for both a wireless power transmitter and receiver.

Turning to FIG. 5, an expanded illustration of the ring buffer is provided. A first pass of voltage, current, and power samples as described above are stored in registers/memory positions 541a, 542a, 543a, 544a, and 545a. A subsequent pass of voltage, current, and power samples can then overwrite these values, being stored in registers/memory positions 541b, 542b, 543b, 544b, and 545b. The a/b memory locations can be the same memory location, with the letter suffix denoting a subsequent sample overwriting a previous sample in circular buffer fashion. Thus, sample v1 stored in register/memory position 541b is the voltage sample immediately subsequent to sample vn stored in 545a and overwrites the previous sample v1 stored in position 541a. Thus, PMU/controller 302 always has available the most recent n samples.

PMU/controller 302 may receive via a communications path 316 a received power packet (RPP) 550. In some embodiments or applications communications path 316 can be an in-band communications path, meaning that data is sent from the wireless power receiver to the wireless power transmitter by modulation of the voltage, current, and/or power on the inductive power transfer link. Alternatively, communications path 316 could be a separate physical channel, such as Bluetooth or NFC (near-field communication). In either case, received power packet 550 can provide a measurement of power received by the wireless power receiver and timing information to indicate the time interval over which that power was received. In some cases, the timing information may be partially or totally contained in a previously received calibration packet. In any case, the interval over which the power was received (i.e., a measurement window), and the time of that window (an offset) can allow the wireless power transmitter to select the appropriate data from the circular buffer to determine the transmitted power over the same interval.

As an example, received power packet 550 can indicate a total power received by the wireless power receiver over an interval corresponding to the measurement window illustrated in FIG. 5. Based on the duration of the measurement window and the offset between the received power packet, the wireless power transmitter, particularly power management accumulator 321, can determine the appropriate memory locations 551-555 in its memory buffer that contain the corresponding transmitted power measurements. Power management accumulator 321 may then employ dedicated hardware to sum the power samples in memory locations 551-555 to determine the transmitted power that corresponds to the received power indicated by received power packet 550. Alternatively, this operation could be performed in software, for example in PMU/Controller 302. In either case, power management unit/controller 302 can then compare these two values to determine whether the presence of a foreign object is indicated by the difference between these values and take remedial action, including reducing the amount of power transferred and/or interrupting wireless power transfer.

Figure 6:
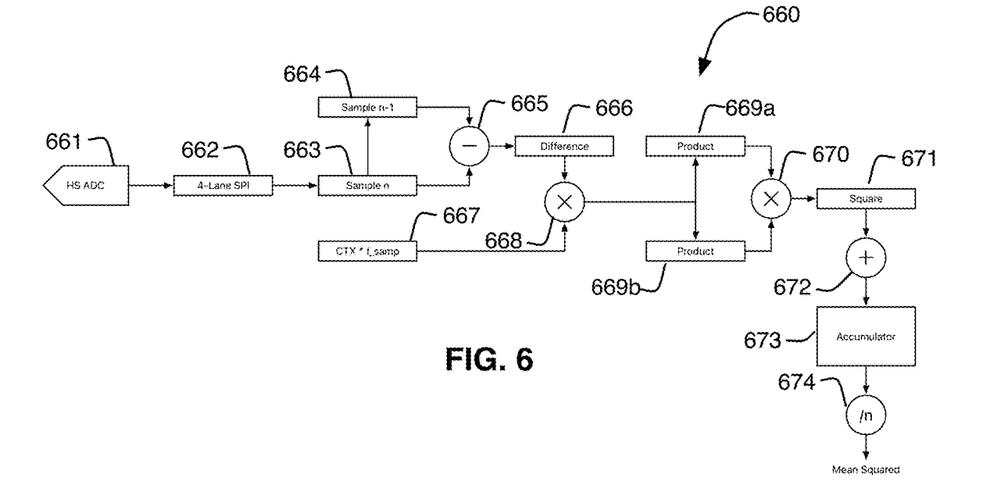
FIG. 6 illustrates a block diagram of a mean-squared current calculator.

In addition to the input power to the wireless power transmitter, the RMS AC current provided to the transmit coil may also be useful for various power accounting techniques. FIG. 6 depicts a block diagram of a hardware mean squared current calculator 600 that can provide RMS current measurements. In the illustrated example, rather than employing a current sensor to measure the transmit coil current directly, sensor 312 may instead measure the voltage across series capacitor Cpri (FIG. 1), which sees the same current as the transmit winding. Because the current through a capacitor is proportional to the derivative (rate of change) of the voltage across the capacitor, the RMS current can be calculated by differentiating the sensed capacitor voltage. Thus, a voltage sensor measuring the voltage across the series capacitor may be coupled to a high speed analog to digital converter (ADC) 661 (FIG. 6). High speed ADC 661 may be high speed relative to the ADCs discussed above that are coupled to the DC input voltage and current sensors 212 and 213. The exact speed of the various ADCs is a matter of design choice taking into account the particular goals of a given implementation.

High speed ADC 661 may be coupled to a four lane serial peripheral interface (SPI) 662, or any other suitable interface that allows for communication with the remainder of the hardware. In some embodiments, high speed ADC 661 may be on the same chip, in which case the SPI (or other interface) could be omitted. In any of these various configurations, a capacitor voltage sample may be stored in a suitable storage register 663, with the preceding sample also being stored/retained in register 664. Block 665 may be a subtractor circuit that computes the difference 666 between these two capacitor voltage samples, which provides the numerator for the differentiated capacitor voltage. Register 667 may store a value corresponding to the capacitance value CTX of the series capacitor Cpri times the sampling frequency. Hardware multiplier block 668 can multiply the voltage difference of register 667 by the capacitance times sampling frequency result stored in register 667 to produce the instantaneous current through the capacitor (C*dV/dT). This instantaneous current result can be stored in two registers 669a and 669b, which can be multiplied together by hardware multiplier block 670 to produce a squared current, which can be stored in register 671. This squared current can be added (block 672) to an accumulator 673 that can accumulate a number of squared current samples. Divider block 674 can at suitable intervals divide the accumulated value by the number of samples in that interval to produce a mean squared current. If desired, a square root block (not shown) could take the square root of the mean squared current to produce a RMS current value. However, for power calculations the squared RMS current (i.e., the mean squared current) is required, so the square root block can be omitted.

In some embodiments it may be desirable to store RMS current samples (or mean squared current samples) that correspond to the input DC voltage, current, and power samples described above with reference to FIGS. 4 and 5. To that end, the interval used by accumulator circuitry 673 and divider 674 can correspond to the ratio between the speed of high speed ADC 661 sampling the capacitor voltage and the ADCs corresponding to sensors 212 and 213 for the DC input voltage and current measurements. As an example, if high speed ADC 661 is 10× as fast as the ADCs used for the DC input samples, than accumulator 673 can accumulate 10 squared current measurements, and divider 674 can divide by 10 in a manner synchronized with the DC sampling operation to provide RMS (or mean squared) current samples that may be stored in conjunction with the DC samples described above with reference to FIGS. 4 and 5.

The foregoing describes exemplary embodiments of wireless power transfer transmitters, receivers, and systems using hardware based power accounting blocks. Such systems may be used in a variety of applications but may be particularly advantageous when used in conjunction with wireless power transfer systems personal electronic devices such as a mobile phones, smart watches, and/or tablet computers including accessories for such devices such as wireless earphones, styluses, and the like. However, any wireless power transfer system for which increased overall efficiency is desired may advantageously employ the techniques described herein. Although numerous specific features and various embodiments have been described, it is to be understood that, unless otherwise noted as being mutually exclusive, the various features and embodiments may be combined in various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A wireless power transmitter comprising:
   an inverter that receives a direct current (DC) input and generates an alternating current (AC) output to drive a wireless power transmit coil coupled to an output of the inverter;
   voltage and current sensors that measure the DC input;
   a power management accumulator; and
   a programmable controller;
   wherein the power management accumulator further comprises:
      dedicated hardware that receives voltage and current samples from the voltage and current sensors and multiplies corresponding voltage and current samples to produce corresponding power samples, thereby reducing computational burden on the programmable controller; and
      memory locations that store the corresponding voltage, current, and power samples; and
   wherein the programmable controller controls switching devices of the inverter responsive at least in part to the corresponding voltage, current and power samples stored in the memory locations of the power management accumulator.

2. The wireless power transmitter of claim 1 wherein the memory locations form a circular buffer.

3. The wireless power transmitter of claim 1 wherein the programmable controller receives information from a wireless power receiver indicating power received by the wireless power receiver over a time interval.

4. The wireless power transmitter of claim 3 wherein the programmable controller compares the power received by the wireless power receiver over the time interval to the corresponding power samples stored in the memory locations of the power management accumulator for the time interval to detect a foreign object.

5. The wireless power transmitter of claim 4 wherein the programmable controller reduces or stops wireless power transfer responsive to detecting the foreign object.

6. The wireless power transmitter of claim 1 wherein two or more of the inverter, the power management accumulator, and the programmable controller are combined into a single integrated circuit.

7. The wireless power transmitter of claim 1 further comprising a hardware mean squared current calculator that computes values corresponding to a root mean squared (RMS) current delivered to the wireless power transmit coil.

8. The wireless power transmitter of claim 7 wherein the values corresponding to the RMS current delivered to the wireless power transmit coil are stored in the memory locations of the power management accumulator.

9. The wireless power transmitter of claim 7 wherein the hardware mean squared current calculator includes dedicated hardware blocks that receive capacitor voltage samples of a voltage appearing across a capacitor in series with the wireless power transmit coil, determine a current through the capacitor from the capacitor voltage samples, and calculate values corresponding to the RMS current delivered to the wireless power transmit coil from the determined current.

10. The wireless power transmitter of claim 7 wherein three or more of the inverter, the power management accumulator, the mean squared current calculator, and the programmable controller are combined into a single integrated circuit.

11. An integrated circuit for use in a wireless power transfer system, the integrated circuit comprising:
- a plurality of switching devices operable as an inverter of a wireless power transmitter;
- voltage and current sensors coupled to the plurality of switching devices that measure a direct current (DC) input into the switching devices;
- a power management accumulator; and
- a programmable controller;
- wherein the power management accumulator further comprises:
  - dedicated hardware that receives voltage and current samples from the voltage and current sensors and multiplies corresponding voltage and current samples to produce corresponding power samples, thereby reducing computational burden on the programmable controller; and
  - memory locations that store the corresponding voltage, current, and power samples; and
- wherein the programmable controller controls the plurality of switching devices responsive at least in part to the corresponding voltage, current or power samples stored in the memory locations of the power management accumulator.

12. The integrated circuit of claim 11 wherein the memory locations form a circular buffer.

13. The integrated circuit of claim 11 wherein the programmable controller receives information from a wireless power receiver indicating power received by the wireless power receiver over a time interval.

14. The integrated circuit of claim 13 wherein the programmable controller compares the power received by the wireless power receiver over the time interval to the corresponding power samples stored in the memory locations of the power management accumulator for the time interval to detect a foreign object.

15. The integrated circuit of claim 14 wherein the programmable controller reduces or stops wireless power transfer responsive to detecting the foreign object.

16. The integrated circuit of claim 11 further comprising a hardware mean squared current calculator that computes values corresponding to root mean squared (RMS) current through the wireless power transfer coil.

17. The integrated circuit of claim 16 wherein the values corresponding to the RMS current through the wireless power transfer coil are stored in the memory locations of the power management accumulator.

18. The integrated circuit of claim 16 wherein the hardware mean squared current calculator includes dedicated hardware blocks that receive capacitor voltage samples of a voltage appearing across a capacitor in series with the wireless power transfer coil, determine a current through the capacitor from the capacitor voltage samples, and calculate values corresponding to the RMS current through the wireless power transfer coil from the determined current.

19. An integrated circuit for use in a wireless power transfer system, the integrated circuit comprising:
- a plurality of switching devices operable as a rectifier of a wireless power receiver;
- voltage and current sensors coupled to the plurality of switching devices that measure a direct current (DC) output from the switching devices;
- a power management accumulator; and
- a programmable controller;
- wherein the power management accumulator further comprises:
  - dedicated hardware that receives voltage and current samples from the voltage and current sensors and multiplies corresponding voltage and current samples to produce corresponding power samples, thereby reducing computational burden on the programmable controller; and
  - memory locations that store the corresponding voltage, current, and power samples; and
- wherein the programmable controller controls the plurality of switching devices responsive at least in part to the corresponding voltage, current or power samples stored in the memory locations of the power management accumulator.

20. The integrated circuit of claim 19 wherein the memory locations form a circular buffer.

21. The integrated circuit of claim 19 wherein the programmable controller transmits information to a wireless power transmitter indicating power received by the wireless power receiver over a time interval.

22. The integrated circuit of claim 19 further comprising a hardware mean squared current calculator that computes values corresponding to a root mean squared (RMS) current through the wireless power transfer coil.

23. The integrated circuit of claim 22 wherein the values corresponding to the RMS current through the wireless power transfer coil are stored in the memory locations of the power management accumulator.

24. The integrated circuit of claim 22 wherein the hardware mean squared current calculator includes dedicated hardware blocks that receive capacitor voltage samples of a voltage appearing across a capacitor in series with the wireless power transfer coil, determine a current through the capacitor from the capacitor voltage samples, and calculate values corresponding to the RMS current through the wireless power transfer coil from the determined current.

\* \* \* \* \*